US012787911B2

(12) United States Patent
Xu et al.

(10) Patent No.: US 12,787,911 B2
(45) Date of Patent: Nov. 10, 2026

(54) RIDING LAWN MOWER

(71) Applicant: Nanjing Chervon Industry Co., Ltd., Nanjing (CN)

(72) Inventors: Yanqing Xu, Nanjing (CN); Dezhong Yang, Nanjing (CN); Zhongyan Hou, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 656 days.

(21) Appl. No.: 18/328,005

(22) Filed: Jun. 2, 2023

(65) Prior Publication Data

US 2023/0309443 A1 Oct. 5, 2023

Related U.S. Application Data

(63) Continuation of application No. PCT/CN2021/120368, filed on Sep. 24, 2021.

(51) Int. Cl.

*A01D 34/00* (2006.01)
*A01D 34/66* (2006.01)
*A01D 34/78* (2006.01)

(52) U.S. Cl.

CPC .......... *A01D 34/006* (2013.01); *A01D 34/66* (2013.01); *A01D 34/78* (2013.01)

(58) Field of Classification Search

CPC ...... A01D 34/006; A01D 34/66; A01D 34/78; A01D 34/86; A01D 34/64; H02P 5/74; H02P 6/04; H02P 21/13

(Continued)

(56) References Cited

U.S. PATENT DOCUMENTS 3,561,282 A 2/1971 Hershman
3,732,671 A 5/1973 Allen
(Continued)

FOREIGN PATENT DOCUMENTS

AU 2003200523 B2 9/2004
CN 1307445 A 8/2001
(Continued)

OTHER PUBLICATIONS

Non-final Office Action from U.S. Appl. No. 18/327,653, dated Sep. 5, 2025, 19 pp.

(Continued)

*Primary Examiner* — Valentin Neacsu
*Assistant Examiner* — Morgan Knauf
(74) *Attorney, Agent, or Firm* — Greenberg Traurig, LLP

(57) ABSTRACT

A riding lawn mower includes: a walking assembly including a left walking motor and a right walking motor; a left operating member for generating a left operational amount; a right operating member for generating a right operational amount; a walking motor control module for controlling at least one of the left walking motor or the right walking motor. The walking motor control module includes: an input unit for generating a left reference speed and a right reference speed; a decoupling unit for generating a first velocity and a second velocity from the left reference speed and the right reference speed; a processing unit for independently obtaining a first processed velocity from the first velocity and obtaining a second processed velocity from the second velocity; and an output unit for generating a left target speed or a right target speed from the first processed velocity and the second processed velocity.

20 Claims, 11 Drawing Sheets

(58) Field of Classification Search
USPC .......................................................... 180/6.48
See application file for complete search history.

(56) References Cited

U.S. PATENT DOCUMENTS

| | | | | |
|---|---|---|---|---|
| 5,406,778 | A | 4/1995 | Lamb | |
| 5,713,189 | A | 2/1998 | Toman | |
| 5,865,016 | A | 2/1999 | Toman | |
| 5,934,400 | A | 8/1999 | Larsen | |
| 8,011,678 | B1 | 9/2011 | Bell | |
| 9,220,193 | B2 | 12/2015 | Goman | |
| 9,624,890 | B2 | 4/2017 | Koenen | |
| 9,668,405 | B2 | 6/2017 | Albinger | |
| 9,679,419 | B2 | 6/2017 | Dwyer | |
| 10,058,031 | B1 * | 8/2018 | Brown | B60K 7/0007 |
| 10,293,853 | B2 | 5/2019 | Koike et al. | |
| 2004/0002775 | A1 | 1/2004 | Kerner | |
| 2004/0099468 | A1 | 5/2004 | Chernoff | |
| 2007/0081173 | A1 | 4/2007 | Yanada | |
| 2007/0295545 | A1 | 12/2007 | Bernard et al. | |
| 2009/0000839 | A1 | 1/2009 | Ishii | |
| 2009/0188226 | A1 | 7/2009 | Carlson | |
| 2009/0224710 | A1 * | 9/2009 | Mir | H02P 21/14 318/400.15 |
| 2012/0159916 | A1 * | 6/2012 | Ishii | B60L 58/40 56/10.2 G |
| 2012/0317949 | A1 | 12/2012 | Abe et al. | |
| 2013/0030667 | A1 | 1/2013 | Fujimoto | |
| 2015/0201556 | A1 * | 7/2015 | Ito | A01D 34/006 56/10.2 H |
| 2015/0308569 | A1 | 10/2015 | Heathcoat, Jr. | |
| 2016/0106031 | A1 | 4/2016 | Bejcek | |
| 2017/0217488 | A1 * | 8/2017 | Koike | B62D 11/04 |
| 2017/0265395 | A1 | 9/2017 | Kuriyagawa | |
| 2018/0177128 | A1 | 6/2018 | Kuriyagawa et al. | |
| 2018/0338415 | A1 | 11/2018 | Wyatt | |
| 2018/0352736 | A1 | 12/2018 | Kulkarni | |
| 2019/0161081 | A1 | 5/2019 | Ogura | |
| 2020/0205338 | A1 | 7/2020 | Zeiler et al. | |
| 2020/0245560 | A1 | 8/2020 | Legault | |
| 2022/0124972 | A1 | 4/2022 | Dai | |
| 2022/0287218 | A1 | 9/2022 | Yuasa | |

FOREIGN PATENT DOCUMENTS

| | | | | | |
|---|---|---|---|---|---|
| CN | 101032957 | A | | 9/2007 | |
| CN | 201941824 | U | | 8/2011 | |
| CN | 203410502 | U | | 1/2014 | |
| CN | 104166372 | A | * | 11/2014 | |
| CN | 102448283 | A | | 4/2015 | |
| CN | 104509297 | A | | 4/2015 | |
| CN | 104554255 | A | | 4/2015 | |
| CN | 105383544 | A | | 3/2016 | |
| CN | 205454604 | U | | 8/2016 | |
| CN | 205922034 | U | | 2/2017 | |
| CN | 107521456 | A | | 12/2017 | |
| CN | 109379976 | A | | 2/2019 | |
| CN | 110313296 | A | | 10/2019 | |
| CN | 110475468 | B | | 11/2019 | |
| CN | 110677079 | A | * | 1/2020 | H02P 23/12 |
| CN | 110741810 | A | | 2/2020 | |
| CN | 210671321 | U | | 6/2020 | |
| CN | 111492783 | A | | 8/2020 | |
| CN | 211171513 | U | | 8/2020 | |
| CN | 211210526 | U | | 8/2020 | |
| CN | 111756280 | A | | 10/2020 | |
| CN | 211793024 | U | | 10/2020 | |
| CN | 111516747 | A | | 4/2021 | |
| CN | 112740893 | A | | 5/2021 | |
| CN | 112996379 | B | | 6/2021 | |
| CN | 113243196 | A | | 8/2021 | |
| CN | 113273078 | A1 | | 8/2021 | |
| CN | 110989578 | A | | 8/2023 | |
| EP | 2105337 | A1 | | 12/2011 | |
| EP | 2385755 | B1 | | 3/2013 | |
| EP | 2740344 | A2 | | 6/2014 | |
| EP | 3175697 | A1 | | 6/2017 | |
| EP | 3338526 | A1 | | 6/2018 | |
| JP | 2004322809 | A | | 11/2004 | |
| JP | 4270079 | B2 | | 5/2009 | |
| JP | 4605649 | B2 | | 1/2011 | |
| JP | 2012065602 | A | | 4/2012 | |
| WO | 2009041177 | A1 | | 4/2009 | |
| WO | 2010079301 | A1 | | 7/2010 | |
| WO | WO-2019130563 | A1 | * | 7/2019 | B60L 9/18 |
| WO | 2021004448 | A1 | | 1/2021 | |
| WO | 2021004484 | A1 | | 1/2021 | |

OTHER PUBLICATIONS

International Search Report and written Opinion, PCT/CN2021/119281, Jun. 21, 2022, 16 pages.
International Search Report and Written Opinion, PCT/CN2021/119302, Jun. 23, 2022, 24 pages.
International Search Report and Written Opinion, PCT/CN2021/124115, Jul. 1, 2022, 14 pages.
Non-final Office Action from U.S. Appl. No. 18/740,179, dated May 21, 2205, 20 pp.
Extended European Search Report from application No. 25156406.8, dated Apr. 3, 2025, 5 pp.
ISA/CN, International Search Report issued on PCT application No. PCT/CN2021/120368, dated Jun. 22, 2022, 3 pages.
ISA/CN, English translation of International Search Report issued on PCT application No. PCT/CN2021/120368, dated Jun. 22, 2022, 3 pages.
ISA/CN, Written Opinion issued on PCT application No. PCT/CN2021/120368, dated Jun. 22, 2022, 3 pages.
ISA/CN, English translation of Written Opinion issued on PCT application No. PCT/CN2021/120368, dated Jun. 22, 2022, 4 pages.
Extended European Search Report from European application No. 21957152.8, dated Jan. 2, 2024, 6 pp.
Non-final Office Action from U.S. Appl. No. 18/320,304, dated Aug. 31, 2023, 12 pp.
Extended European Search Report from European application No. 21960293.5, dated Nov. 9, 2023, 11 pp.
Non-final Office Action from U.S. Appl. No. 18/320,586, dated Nov. 26, 2025, 15 pp.
PHYS ORG "30 Magnetic Sensor for Rapid-Reaction Gas Pedal" published Jun. 5, 2005, accessed Nov. 14, 2025, at https://phys.org/news/2005-06-3d-magnetic-sensor-rapid-reaction-gas.html.

* cited by examiner

RIDING LAWN MOWER

RELATED APPLICATION INFORMATION

This application is a continuation of International Application Number PCT/CN2021/120368, filed on Sep. 24, 2021, which application is incorporated herein by reference in its entirety.

BACKGROUND

Lawn mowers are widely used in gardening to trim lawn and vegetation. Lawn mowers generally include hand push lawn mowers and riding lawn mowers. A user sits on and drives the riding lawn mower to perform lawn mowing tasks, making lawn mowing more efficient and less tiring. Riding lawn mowers are equipped with operating members that allow the user to drive the riding lawn mower to walk at a desired walking speed and in a desired walking direction. Generally, a riding lawn mower includes at least a left drive wheel and a right drive wheel, respectively driven by a left motor and a right motor, to achieve the desired walking speed and the desired walking direction.

The most common types of operating members for riding lawn mowers are lap bars and steering wheels. In the related art, the most common steering on a zero turn mower is lap bar steering. Lap bar mowers accelerate by pushing the bars forward and steer similarly to riding a horse. When you want to turn the mower left, pull the left bar towards yourself, and when turning right, pull the right bar. By pushing the one of the bars forward and pulling the other one of the bars towards yourself, the left drive wheel and the right driven wheel are driven in different directions from each other, thereby making a "zero turn". The front wheels on a lap bar mower are generally casters and roll freely like on a shopping cart. When travelling or working on a flat lawn, lap bar riding lawn mowers are perfectly fine.

However, it is problematic when the riding lawn mower travels or works on a slope; especially when traversing a sloping surface horizontally, an inclined downward force is applied to the riding lawn mower due to the gravity of the riding lawn mower, so the riding lawn mower tends to make a turn inclined downward. Further, the wheels are subject to forces of different magnitudes, for example, the wheels on the lower side of the slope are subject to a greater inclined downward force than the wheels on the higher side of the slope. Also, as the front wheels are configured to roll freely, the riding lawn mower doesn't have much traction force in the front, so the front wheels of the riding lawn mower have a tendency slide down the slope. In this case, the user has to manipulate the operating member very dedicatedly to compensate for the inclined downward force in order for the riding lawn mower to turn to or keep the desired direction. Especially for lap bar riding lawn mowers, it is very hard for the user to manipulate two lap bars to keep adjusting for the right compensation to traverse a sloping surface, bringing a bad driving experience.

Engineers have been working for years to overcome this issue. For example, some riding lawn mowers on the market are equipped with several high-flotation/low pressure tires to allow it to traverse the steep slopes. However, the high-flotation/low pressure tires increases the cost of the riding lawn mower, as well as the size of the riding lawn mower. For another example, according to a riding type grass mower vehicle disclosed in the Japanese Patent Application Publication No. 2008-168871 (JP 2008-168871 A) (paragraphs [0012-0033, 0080 -0106], FIG. 3, FIG. 4), the vehicle includes at least two main drive wheels and a caster wheel. The vehicle further includes a switching means for switching to either a forcible steering mode in which the caster wheel is forcibly steered by a steering power source, or to a free steering mode in which the caster wheel is rendered freely steerable by blocking the power transmission from the steering power source. With this vehicle, in the case of traveling on or traversing a ground surface or grass field having a slope, the mode is switched over to the forcible steering mode, whereby it becomes possible to prevent the caster wheel to be oriented more downward than the direction desired by the driver. However, switching between the two steering modes may require more driving skills from the user and the caster wheel may not provide enough torque to offset the inclined downward turning tendency on a steep slope. As another solution to the above-described problem, in the Japanese Patent Application Publication No. 2009-255840 (JP 2009-255840 A) (paragraphs [0012-0026, 0098-0109], FIG. 12-FIG. 13), there are provided a roll angle detecting means (a roll angle sensor) for detecting a state wherein the vehicle is pivotally inclined relative to an axis extending through the center of gravity of the vehicle oriented along the fore/aft direction, and a roll angle correcting means. However, the roll angle is not the only influencing factor for the inclined downward force. Theoretically, other factors such as frictional force between the wheels and the sloping surface also influence the correcting amount, and these factors may also change over time.

SUMMARY

According to an example, a riding lawn mower is provided including: a seat for a user to sit thereon; a chassis configured to support the seat; a walking assembly configured to drive the riding lawn mower to walk, the walking assembly includes at least one first walking wheel and two second walking wheels, the two second walking wheels are a left second walking wheel and a right second walking wheel, the walking assembly further includes a left walking motor for driving the left second walking wheel and a right walking motor for driving the right second walking wheel; a left operating member and a right operating member, the left operating member is operable by the user to generate a left operational amount, the right operating member is operable by the user to generate a right operational amount; a walking motor control module configured to receive at least one of the left operational amount or the right operational amount, and control at least one of the left walking motor or the right walking motor; wherein the walking motor control module includes a target speed calculation unit, the target speed calculation unit including: an input unit configured to generate a left reference speed and a right reference speed from at least one of the left operational amount or the right operational amount; a decoupling unit configured to generate a first velocity and a second velocity from the left reference speed and the right reference speed; a processing unit configured to independently obtain a first processed velocity from the first velocity and obtain a second processed velocity from the second velocity; and an output unit configured to generate a left target speed for the left walking motor or a right target speed for the right walking motor from the first processed velocity and the second processed velocity.

In one example, the first velocity is a linear velocity and the second velocity is an angular velocity.

In one example, the riding lawn mower further includes a left walking motor control module configured to control the left walking motor and a right walking motor control module configured to control the left walking motor.

In one example, the left walking motor control module calculates the left target speed for the left walking motor, and the right walking motor control module calculates the right target speed for the left walking motor.

In one example, the left walking motor control module receives both the left operational amount and the right operational amount, the left reference speed is a mapped value of the left operational amount, and the right reference speed is a mapped value of the right operational amount.

In one example, the left walking motor control module receives the left operational amount and an actual rotational speed of the right walking motor.

In one example, the decoupling unit calculates the first velocity as an average value of the left reference speed and the right reference speed, and calculates the second velocity as a difference between the left reference speed and the right reference speed divided by a distance between the left second walking wheel and the right second walking wheel.

In one example, the processing unit makes the processed first velocity subject to a maximum acceleration value.

In one example, the riding lawn mode has different driving modes.

In one example, the processing unit is configured with different coefficients or functions for calculating the processed first velocity from the first velocity or calculating the processed second velocity from the second velocity across different driving modes.

According to an example, a riding lawn mower is provided including: a seat for a user to sit thereon; a chassis configured to support the seat; a walking assembly configured to drive the riding lawn mower to walk, the walking assembly includes a walking wheel and a walking motor for driving the walking wheel; an operating member operable by the user to generate an operational amount; a walking motor control module configured to receive the operational amount and control the walking motor; the walking motor control module includes: a target speed calculation unit configured to generate a target speed of the walking motor based on the operational amount, a velocity controller configured to generate a target current of the walking motor based on the target speed and a detected actual speed of the walking motor; a flux controller and a torque controller configured to generate a first voltage adjustment amount and a second voltage adjustment amount according to the target current and a detected actual current of the walking motor; wherein the walking control module includes a compensator for compensating load on the walking motor.

In one example, the velocity controller includes a proportional term of the difference of the target speed and the detected actual speed of the walking motor.

In one example, the velocity controller includes a current compensator, which generates a compensation amount based on the detected actual current of the walking motor.

In one example, the velocity controller includes a disturbance observer and a feedback compensator.

In one example, the disturbance observer derives a compensation amount based on the detected actual speed of the walking motor and the target current output by the velocity controller.

In one example, the torque controller includes a proportional term of the difference of a quadrature axis portion of the target current and a quadrature axis portion of the detected actual current of the walking motor.

In one example, the torque controller includes a disturbance observer and a feedback compensator.

In one example, the disturbance observer derives a compensation amount based on the quadrature axis portion of the detected actual current of the walking motor and the second voltage adjustment amount output by the torque controller.

In one example, the operating member includes a left operating member and a right operating member, the left operating member is operable by the user to generate a left operational amount, the right operating member is operable by the user to generate a right operational amount.

In one example, the target speed calculation unit is configured to generate the target speed of the walking motor through generating a linear velocity and an angular velocity from the left operational amount and the right operational amount.

DETAILED DESCRIPTION

Figure 1:
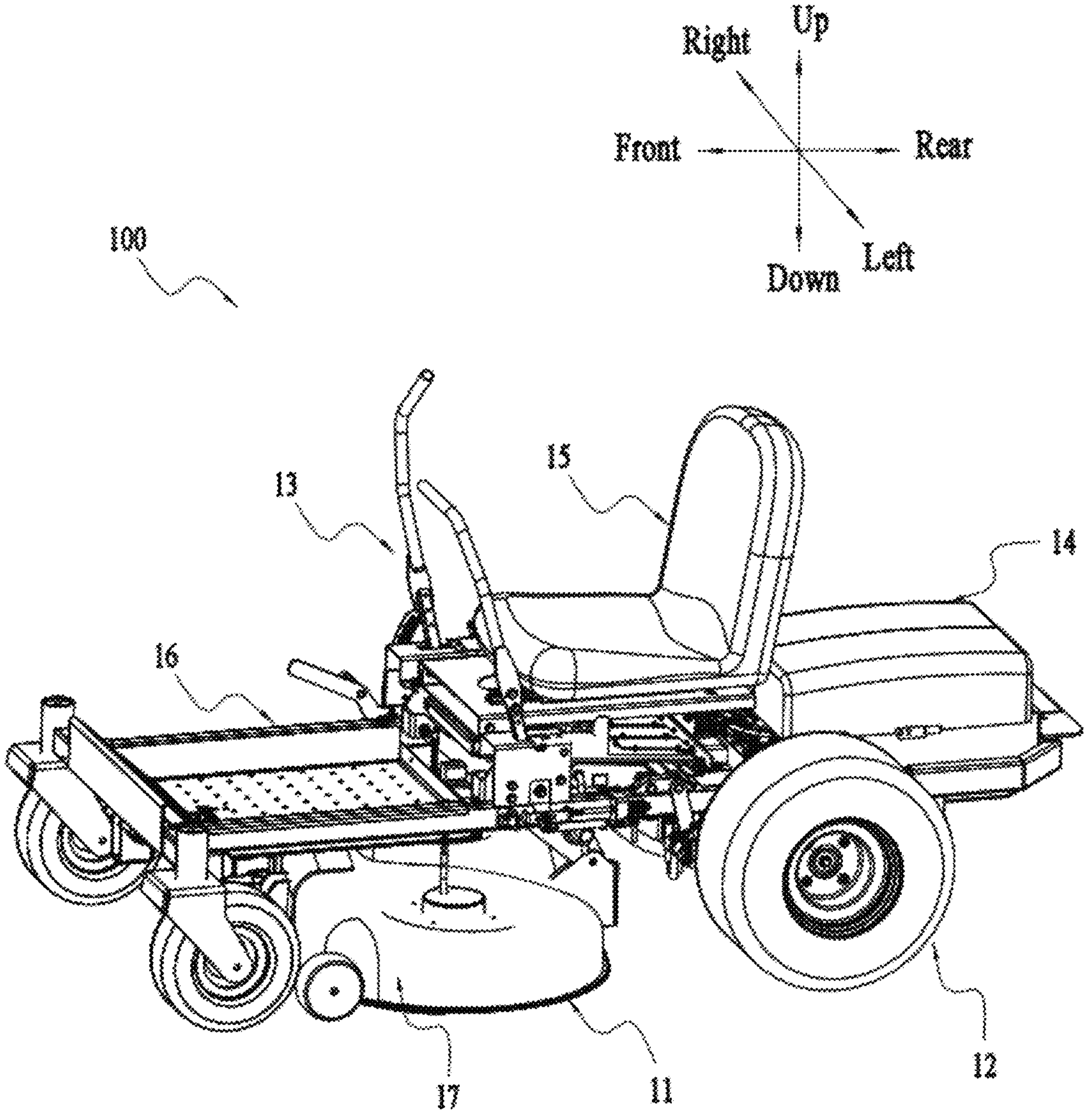
FIG. 1 is a perspective view of a riding lawn mower according to an example of the present application.

As shown in FIG. 1, a riding lawn mower 100 can be operated by a user sitting on the riding lawn mower 100 to effectively and quickly trim the lawn, vegetation, etc. Comparing with hand push/walk behind lawn mowers, the riding lawn mower 100 of the present disclosure does not require the user to push the machine, nor does it require the user to walk on the ground. Further, because of its large size, the riding lawn mower 100 is able to carry larger or more batteries, which brings a longer working time, so that the user can trim larger lawn areas, and trim for a longer time effortlessly. Furthermore, in terms of energy source, unlike existing riding lawn mowers, the riding lawn mower 100 uses electric energy rather than gasoline or diesel, thus the riding lawn mower 100 is more environmentally friendly, cheaper in usage cost, and less prone to leakage, failure and maintenance.

It is appreciated that aspects of this disclosure are also applicable to riding machines of other types, as long as the riding machine can output power in other forms besides walking power in order to realize other functions besides walking, such as, for example, riding snow blowers, riding agricultural machines, and riding sweepers. In fact, as long as these tools include the substance described below in this disclosure, they all fall within the scope of this disclosure.

Those skilled in the art should understand that, in the disclosure of this application, the terms “controller”, “control module”, “module”, “unit” and “processor” may include or relate to at least one of hardware or software.

Those skilled in the art should understand that, in the disclosure of this application, the terms “up”, “down”, “front”, “rear”, “left”, “right” and the like indicate the orientation or positional relationship based on the orientation or positional relationship shown in the drawings, which are only for the convenience of describing the present application, and do not indicate or imply that the device or element referred to must have a specific orientation, or be constructed and operated in a specific orientation, and therefore the above terms should not be understood as a limitation of the present application.

Figure 2:
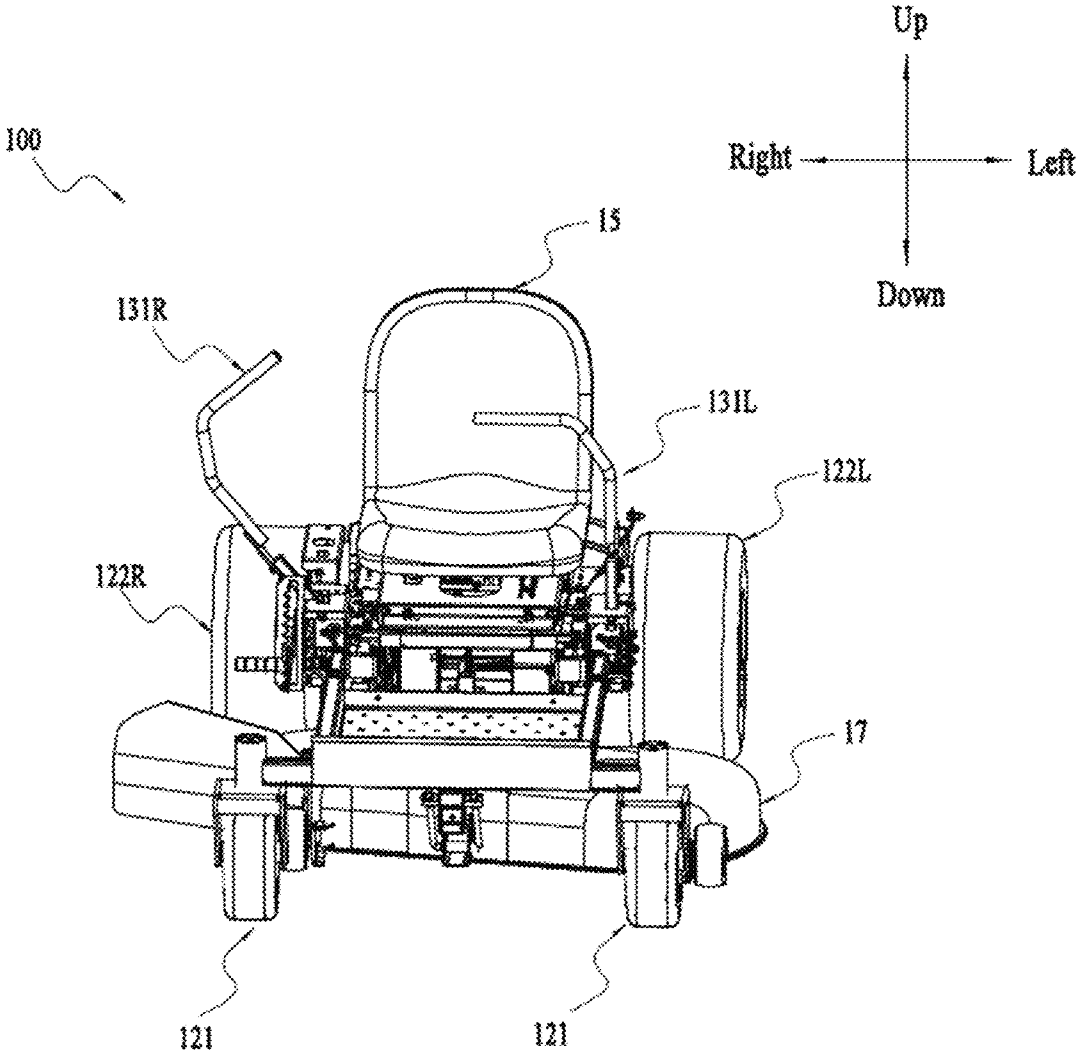
FIG. 2 is a front view of the riding lawn mower in FIG. 1.
Figure 3:
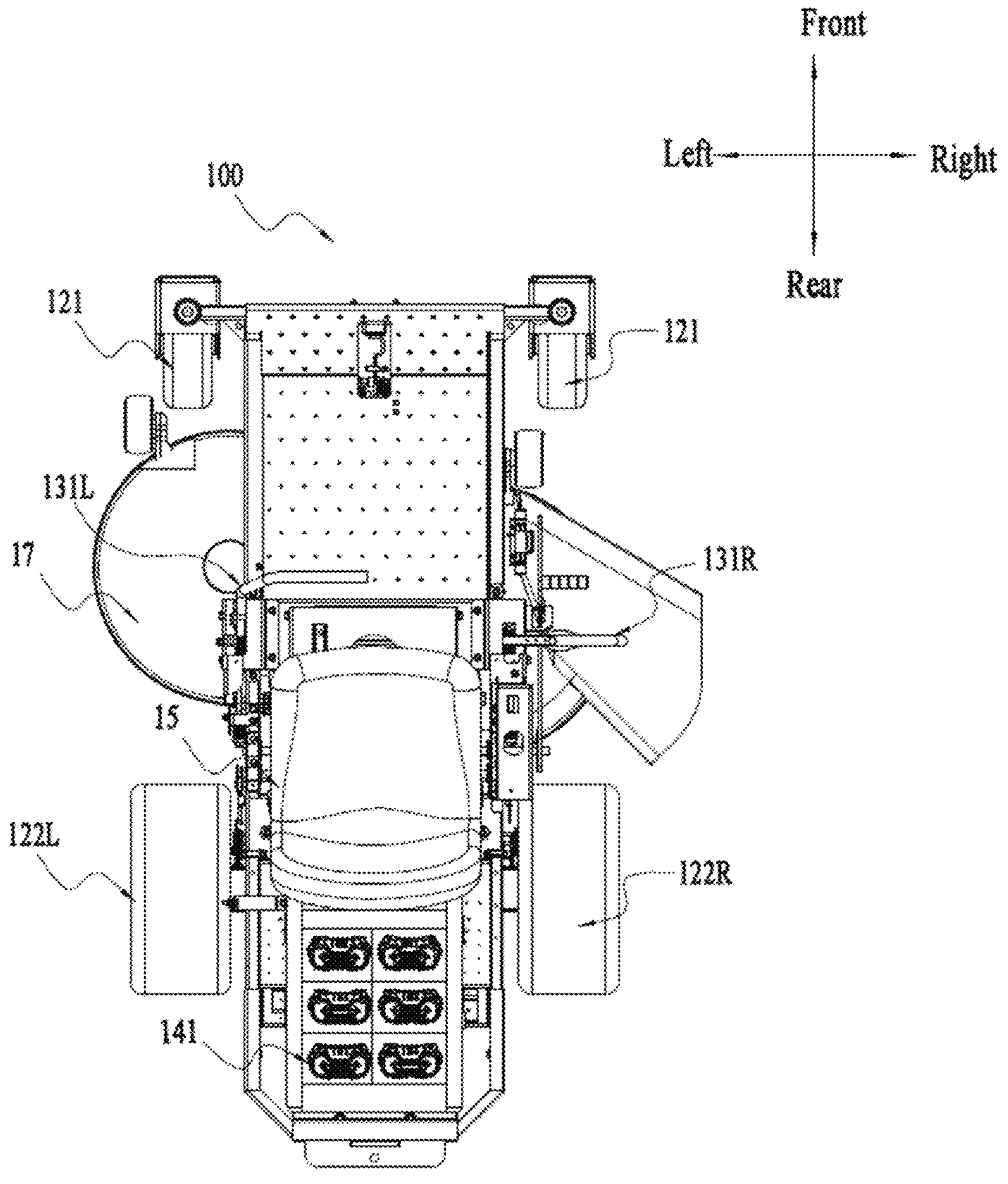
FIG. 3 is a top view of the riding lawn mower in FIG. 1.

Referring to FIGS. 1-3, the riding lawn mower 100 includes: a cutting assembly 11, a walking assembly 12, an operating assembly 13, a power supply assembly 14, a seat 15, a chassis 16, and a deck 17. The chassis 16 is the main supporting frame of the riding lawn mower 100, and the chassis 16 at least partially extends in a front and rear direction. The seat 15 is configured for a user to sit thereon, and the seat 15 is mounted on the chassis 16. The deck 17 is configured to accommodate the cutting assembly 11, and the deck 17 is installed under the chassis 16.

According to FIG. 1, the direction toward which the user sits on the seat 15 is defined as the front or the front side of the riding lawn mower 100; and the direction opposite to the front is defined as the rear or rear side of the riding lawn mower 100. The user’s left hand direction is defined as the left or left side of the riding lawn mower 100; and the user’s right hand direction is defined as the right or right side of the riding lawn mower 100. The direction toward the plane on which the riding lawn mower 100 walks is defined as the down or lower side of the riding lawn mower 100; and the direction opposite to the down is defined as the up or upper side of the riding lawn mower 100.

Figure 4:
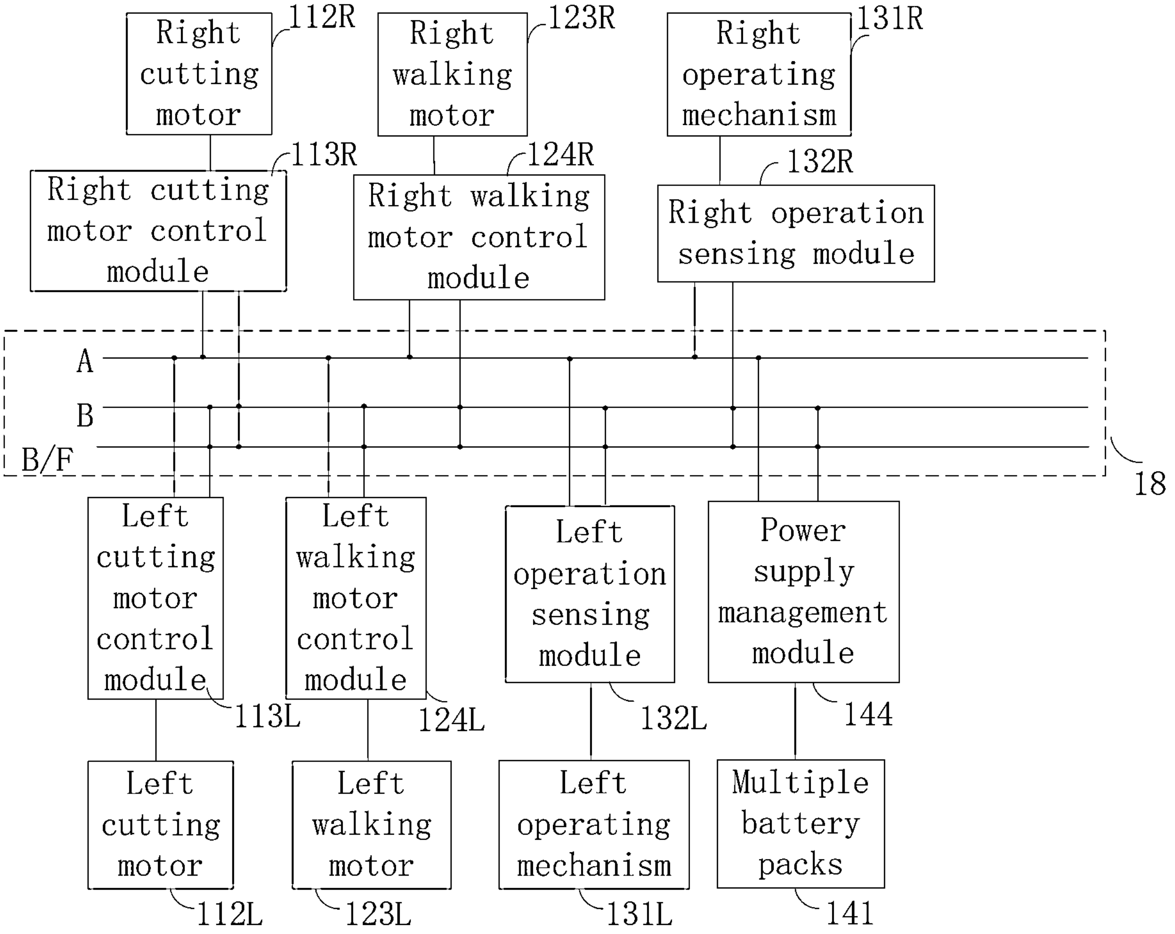
FIG. 4 is a schematic diagram of a communication system of the riding lawn mower.

Referring to FIG. 4, the cutting assembly 11 includes a cutting member, such as, for example, a blade, for realizing a cutting function. The cutting assembly 11 is mounted to the chassis 16, under the deck 17. In other words, the deck 17 forms a semi-opening accommodating cavity to accommodate the cutting member. The cutting assembly 11 further includes a cutting motor 112 for driving the cutting member to rotate. The cutting assembly 11 may include more than one cutting members and more than one cutting motors 112. In one example, the riding lawn mower 100 includes two cutting members and two cutting motors 112, namely a left cutting motor 112L and a right cutting motor 112R. The cutting motors 112 are controlled by a cutting control module 113, or two cutting control modules, namely a left cutting motor control module 113L and a right cutting motor control module 113R, to drive the cutting members 111 to rotate. In some examples, the cutting control module includes a control chip, such as MCU, ARM, and so on.

The walking assembly 12 is configured to enable the riding lawn mower 100 to walk on the ground. The walking assembly 12 may include at least one first walking wheel 121 and at least two second walking wheels 122, for example, two second walking wheels 122, namely a left second walking wheel 122L and a right second walking wheel 122R. The first walking wheel 121 is configured to rotate freely. The first walking wheel 121 has a first diameter; the second walking wheel 122 has a second diameter larger than the first diameter. The walking assembly 12 may also include at least one walking motor 123, for example, two walking motors 123, namely a left walking motor 123L and a right walking motor 123R, for driving the second walking wheels 122. In this way, when the two walking motors 123 drive the corresponding second walking wheels 122 to rotate at different speeds, a speed difference is generated between the two second walking wheels 122, so as to steer the riding lawn mower 100. The walking motor 123 is controlled by a walking motor control module 124. In some examples, the walking motor control module 124 includes a control chip, such as MCU, ARM, and so on. In one example, two walking motor control modules 124 control the two walking motors 123, respectively.

The power supply assembly 14 is configured to supply electric power to the riding lawn mower 100. In some examples, the power supply assembly 14 includes a plurality of battery packs 141 capable of supplying electric power to the riding lawn mower 100. The power supply assembly 14 is configured to at least supply electric power to the cutting motors 112 and the walking motors 123. The power supply assembly 14 may also supply electric power to other electronic components in the riding lawn mower 100, such as the cutting control module 113 and the walking motor control module 124. The power supply assembly 14 may include a power supply management module 144 to coordinate and control the discharge process of at least one battery packs 141. In some examples, the power supply assembly 14 is provided on the rear side of the seat 15 on the chassis 16.

The operating assembly 13 is operable by the user, and the user sends control instructions through the operating assembly 13 to control the operation of the riding lawn mower 100. The operating assembly 13 can be operated by the user to set the cutting speed, walking speed, walking direction, etc. of the riding lawn mower 100. In other words, the operating assembly 13 is operable by the user to set an operating status for the riding lawn mower 100, wherein the operating status includes a cutting status and a walking status. For example, the walking motor control module 124 is configured to receive an operational amount from an operating member 131 of the operating assembly 13 and control the walking assembly 12 based on the operational amount. The operating assembly 13 may include a combination of one or more operating members 131 such as pedal, lever, handle, and steering wheel. Further, the operating assembly 13 includes one or more operation sensing module 132 enabled to sense the states or operational amount of the operating members 131.

In one example, as shown in FIGS. 1-4, the operating members 131 include a left operating member 131L and a right operating member 131R. The left operating member 131L is operable by the user to generate a left operational amount, the right operating member 131R is operable by the user to generate a right operational amount. Specifically, the left operating member 131L is a left operating lever 131L; and the right operating member 131R is a right operating lever 131R. The detected states/operational amount of the left operating lever 131L and the right operating lever 131R are used by the walking motor control module 124 to control the left walking motor 123L and the right walking motor 123R, so as to control the two second walking wheels 122. Specifically, the operation sensing module 132 includes at least one position sensor, which is configured to detect the position of the operating lever 131. The position sensor may be a magnetic sensor, and the operating lever 131 may be coupled with a magnetic element so that the magnetic sensor can detect the position of the magnetic element, and thus the position of the operating lever 131. When the operating lever 131 is in different positions, the position sensor outputs detected position signals representing different positions. The positions of the operating lever 131 may be angular positions and may be represented by angle values. In one example, the operation sensing module 132 includes a left operation sensing module 132L for detecting the position of the left operating lever 131L, and a right operation sensing module 132R for detecting the position of the right operating lever 131R.

The riding lawn mower 100 may further include a bus module 18, and the bus module 18 is connected with a variety of modules, for example, the bus module 18 is at least connected with the cutting control module 113, the walking motor control module 124, the operation sensing module 132, and the power supply management module 142. The cutting control module 113, the walking motor control module 124, the operation sensing module 132, and the power supply management module 142 can all send data to the bus module 18, and receive data through the bus module 18. Each module may obtain the bus control right to send data by competing for the busy line B/F, and the module that obtains the bus control right realize occupation and release of the bus through a “busy bus” signal and an “idle bus” signal. All modules are enabled to receive data from the bus module 18, determine whether the information is relevant and take corresponding actions.

Referring to a communication system of the riding lawn mower 100 according to a specific example as shown in FIG. 4: there are two cutting control modules 113, namely a left cutting control module 113L and a right cutting control module 112R, which are respectively configured to control a left cutting motor 112L and a right cutting motor 112R; there are two walking motor control modules 124, namely a left walking motor control module 124L and a right walking motor control module 124R, which are respectively configured to control the left walking motor 123L and the right walking motor 123R; there are two operating levers 131 and two operation sensing modules 132: a left operation sensing module 132L configured to detect the state of the left operating lever 131L, and a right operation sensing module 132R configured to detect the state of the right operating lever 131R.

Figure 5:
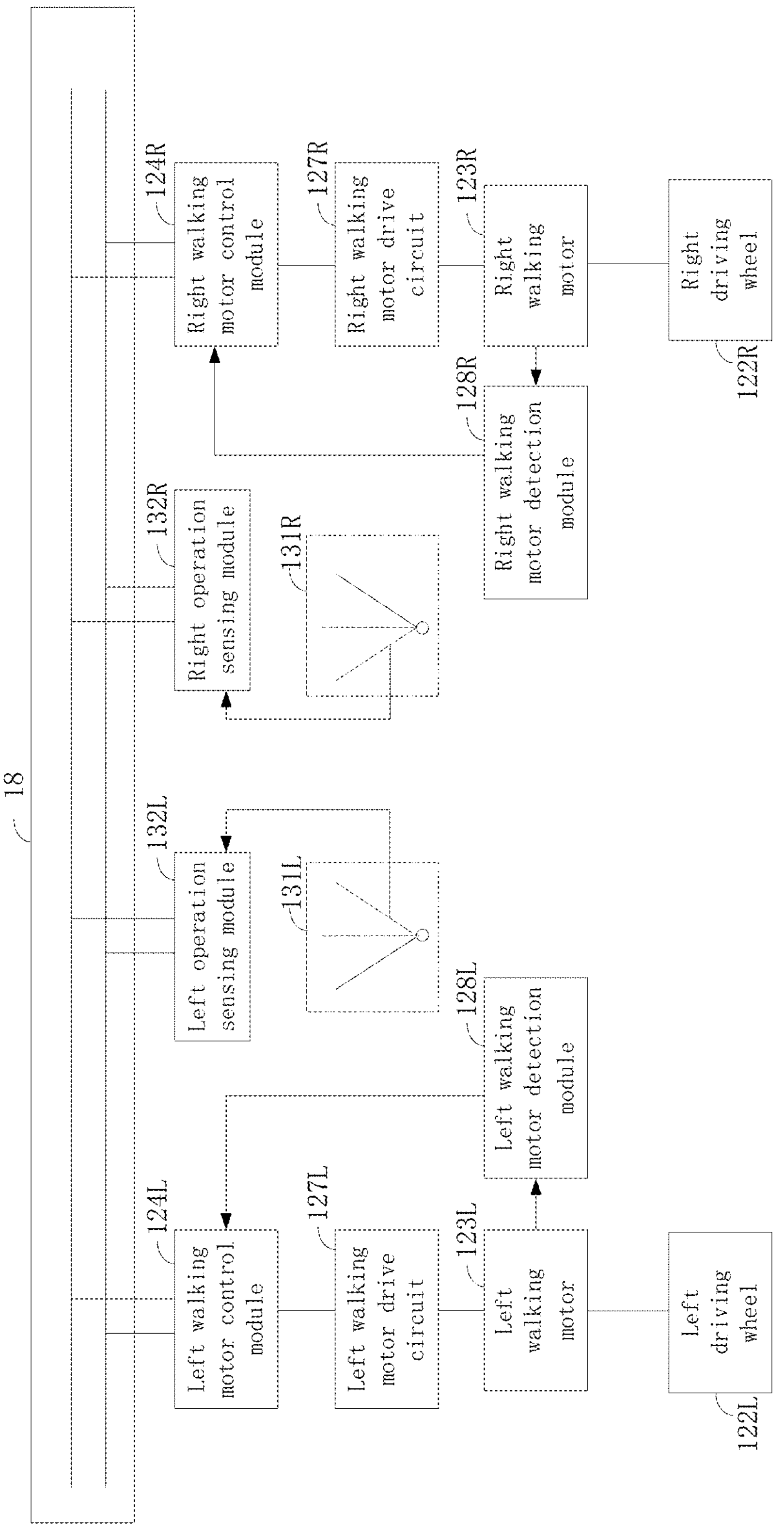
FIG. 5 is a schematic diagram of a control system of a walking assembly of the riding lawn mower.

Referring to FIG. 5, in an example, a control system of the walking assembly 12 includes a left walking control system and a right walking control system. The left walking control system and right walking control system have the same or similar functions and components. For example, the left walking control system mainly includes: the left walking motor control module 124L, a left walking motor drive circuit 127L, a left walking motor detection module 128L, the left walking motor 123L, the left operation sensing module 132L, and the right operation sensing module 132R. The right walking control system mainly includes: the right walking motor control module 124R, a right walking motor drive circuit 127R, a right walking motor detection module 128R, the right walking motor 123R, the left operation sensing module 132L, and the right operation sensing module 132R. In one example, through the bus module 18, the left walking motor control module 124L is communicationally connected with both the left operation sensing module 132L and the right operation sensing module 132R; likewise, the right walking motor control module 124R is communicationally connected with both the left operation sensing module 132L and the right operation sensing module 132R. In one example, the walking motor control module 124 may be configured to receive data from only one operation sensing module 132.

Figure 6:
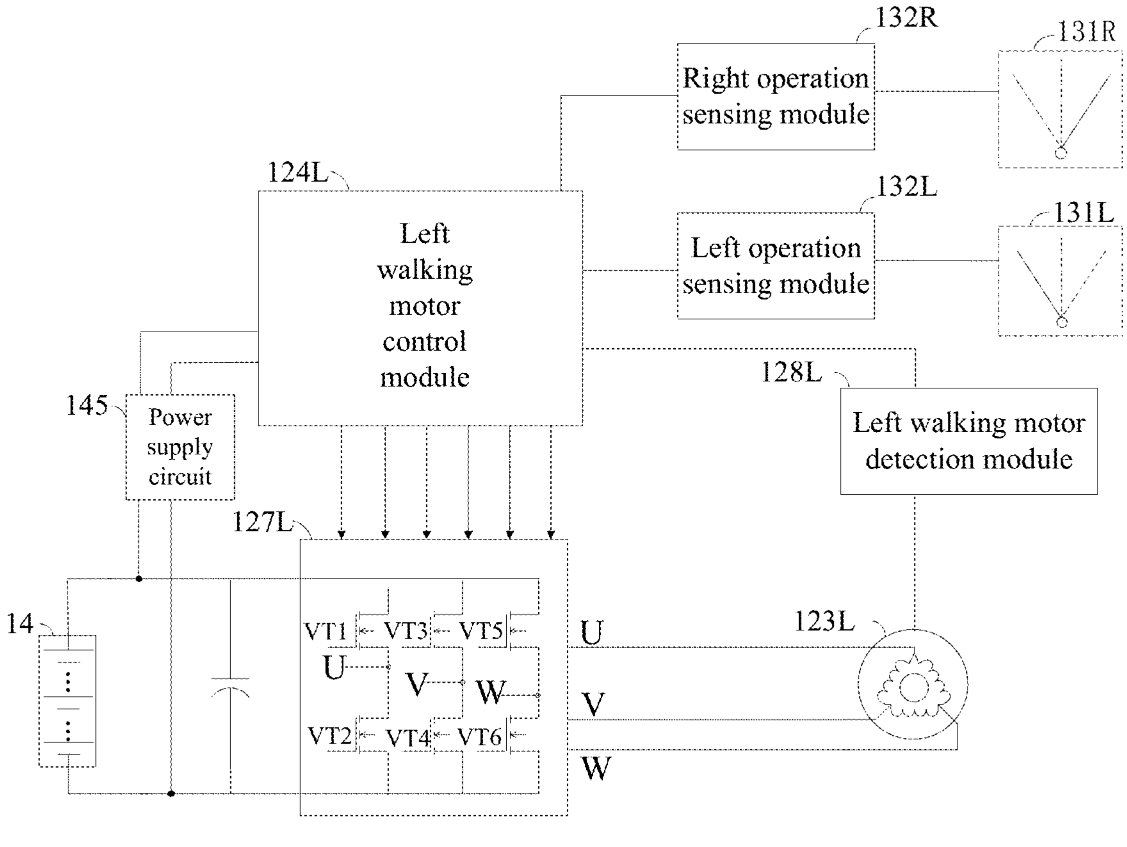
FIG. 6 is a circuit diagram of a left walking control system of the riding lawn mower.

Referring to FIG. 6, according to an example of the left walking control system, the left walking motor control module 124L is configured to control the operation of the left walking motor 123L. The left walking motor control module 124L is configured to compute a target rotational speed of the left walking motor 123L according to the detected position signals of the left operation sensing module 132L and the right operation sensing module 132R; and further compute a control amount of the left walking motor 123L according to the target rotational speed of the left walking motor 123L and the detected values of the left walking motor detection module 128L, and output a control signal to the left walking motor drive circuit 127L, thereby controlling the left walking motor drive circuit 127L to make the left walking motor drive circuit 127L drive the left walking motor 123L to reach or substantially reach the target rotational speed of the left walking motor 123L. The control amount of the left walking motor 123L includes the input voltage and/or the input current of the left walking motor 123L. The power supply circuit 145 is connected to the power supply component 14, and the power supply circuit 145 is used to receive the power from the power supply component 14 and convert the power of the power supply component 14 into at least the power used by the left walking motor control module 124L and the left walking motor drive circuit 127L.

The user manipulates the operating levers 131 to issue commands on the walking speed and the walking direction of the riding lawn mower 100. It has been a long-discussed topic to provide an adequate response to the user’s commands during driving: the response shall not be too slow, which harms the agility of the riding lawn mower 100 and makes the user feel frustrated; the response shall not be too fast either, because sharp, sudden, or even violent movements make the user feel uncomfortable, and less easy to control the riding lawn mower 100. However, related solutions such as filtering do not hit the point. If the position signals of the operating lever 131 are directly filtered, there will be a lag in steering when the acceleration is reduced to a comfortable level, that is, related solutions either sacrifice comfortableness for responsiveness, or sacrifice responsiveness for comfortableness.

Human bodies have different perceptions to velocity, acceleration, and jerk, wherein acceleration is the time derivative of velocity and jerk is the time derivative of acceleration. Jerk is generally undesirable because it creates abrupt, jerky motion. Moderate accelerations make the user feel good with a sense of control, showing good responsiveness of the machine; whereas jerks make the user feel uncomfortable, for example, the user may feel a poke on the waist. Velocity includes linear velocity and angular velocity; similarly, acceleration includes linear acceleration and angular acceleration; and jerk includes linear jerk and angular jerk. In physics, linear velocity is the velocity of an object in a straight line, whereas angular velocity is how fast an objects spins, rotates, or turns; linear acceleration refers to the time rate of change of velocity without a change in direction, whereas angular acceleration refers to the time rate of change of angular velocity.

Therefore, the goal is to keep the rate at which acceleration is increasing or decreasing as small as possible, and at the same time, ensure the responsiveness of the riding lawn mower 100, especially the responsiveness of steering. Generally, in linear movement, the riding lawn mower 100 has more time to reach the desired speed, in other words, it is acceptable to speed up a little bit slower; whereas in steering movement, the riding lawn mower 100 needs to turn to the desired direction in time, otherwise, the riding lawn mower 100 may miss mowing lanes when performing mowing jobs. Thus, in our disclosure, the linear velocity and the angular velocity of the riding lawn mower 100 are decoupled from the detected position signals of the left operation sensing module 132L and the right operation sensing module 132R. The linear velocity of the riding lawn mower 100 reflects the desired walking speed, and the angular velocity of the riding lawn mower 100 reflects the desired walking direction. In this way, the linear velocity and the angular velocity of the riding lawn mower 100 can be processed separately and independently to achieve the goal of stable acceleration but flexible steering.

Figure 8:
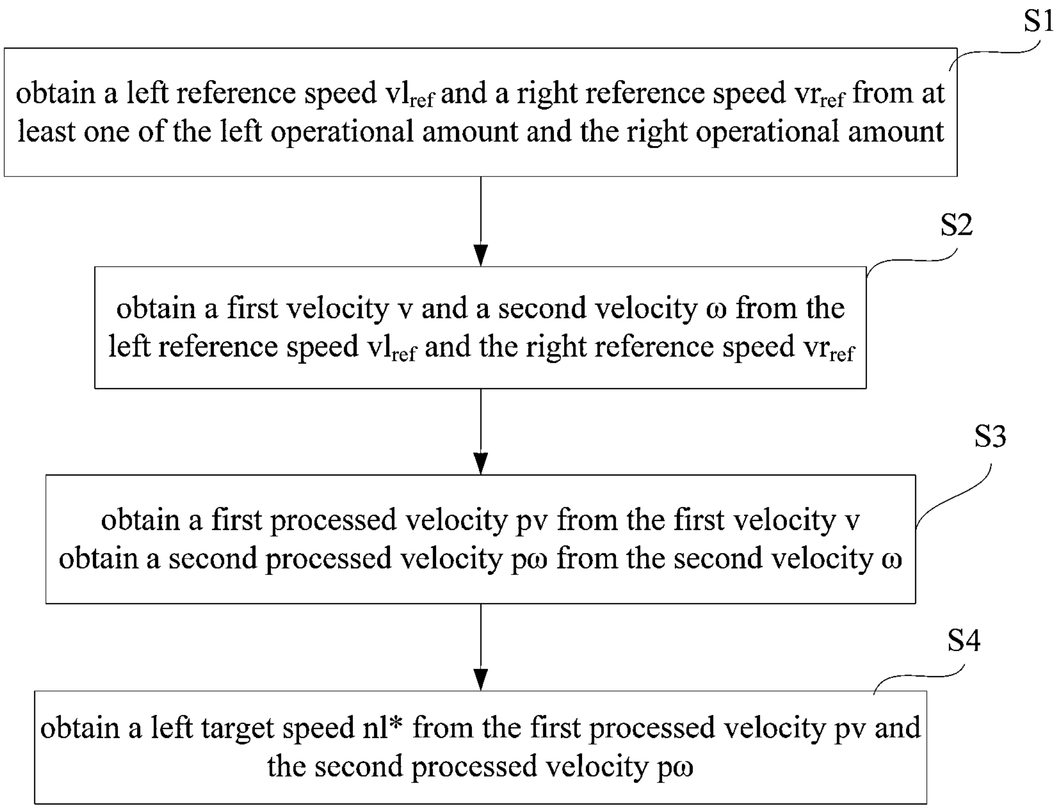
FIG. 8 is a control flow diagram for generating a left target speed for the left walking motor.

In one example, referring to FIG. 8, the left walking motor control module 124L is configured to compute a target rotational speed of the left walking motor 123L from the detected position signals of the left operation sensing module 132L and the right operation sensing module 132R through the following steps:

S1: obtain a left reference speed $vl_{ref}$ and a right reference speed $vr_{ref}$ from at least one of the left operational amount or the right operational amount;

In one example, the walking motor control module 124 is configured with built-in functions or tables to map the position signal of each operating lever 131 into corresponding reference speed, for example, the walking motor control module 124 maps the position signal of the left operation sensing module 132L into a left reference speed $vl_{ref}$, and maps the position signal of the right operation sensing module 132R into a right reference speed $vr_{ref}$. Specifically, the left operating lever 131L and the right operating lever 131R each have a forward position, a reverse position, and a neutral position. When the user wants to go forward, the user pushes the left operating lever 131L and the right operating lever 131R to a certain position in the forward position, the left walking motor control module 124L obtains a positive left reference speed and a positive right reference speed corresponding to the current positions of the operating levers 131 detected by the operation sensing module 132. When user wants to go backward, the user pulls the left operating lever 131L and the right operating lever 131R to a certain position in the reverse position, the left walking motor control module 124L obtains a negative left reference speed and a negative right reference speed corresponding to the current positions of the operating levers 131 detected by the operation sensing module 132. When the user wants to make a zero turn, the user pushes one of the left operating lever 131L or the right operating lever 131R to a certain position in the forward position and pulls one of the left operating lever 131L or the right operating lever 131R to a certain position in the reverse position, the left walking motor control module 124L obtains a negative reference speed and a positive reference speed corresponding to the current positions of the operating levers 131 detected by the operation sensing module 132.

S2: obtain a first velocity v and a second velocity ω from the left reference speed $vl_{ref}$ and the right reference speed $vr_{ref}$.

In one example, the first velocity v is the linear velocity of the riding lawn mower 100, and the second velocity ω is an angular velocity of the riding lawn mower 100; and the process of obtaining the linear velocity and the angular velocity from the left reference speed $vl_{ref}$ and the right reference speed $vr_{ref}$ can be referred to as decoupling. In one example, decoupling can be implemented as follows: the first velocity v is an average value of the left reference speed $vl_{ref}$ and the right reference speed $vr_{ref}$, that is, $v=(vl_{ref}+vr_{ref})/2$; the second velocity ω is the difference between the left reference speed $vl_{ref}$ and the right reference speed $vr_{ref}$ divided by the distance l between the left second walking wheel and the right second walking wheel, that is, $v=(vr_{ref}-vl_{ref})/l$. The decoupling of the first velocity v and the second velocity ω of the riding lawn mower 100, i.e., the linear velocity and the angular velocity of the riding lawn mower 100, enables the first velocity v and the second velocity ω of the riding lawn mower 100, i.e., the linear velocity and the angular velocity of the riding lawn mower 100, to be processed separately and independently.

S3: obtain a first processed velocity pv from the first velocity v; obtain a second processed velocity pω from the second velocity ω.

The first velocity v and the second velocity ω are not directly used by the walking motor control module 124 in the next step. Instead, the first velocity v and the second velocity ω are separately processed to mitigate the variation of the first velocity v and the second velocity ω. In one example, the processed first velocity pv may be a function incorporating the value of the processed first velocity pv in previous iterations. For example, the processed first velocity pv of time T may be calculated from the first velocity v of time T and the processed first velocity pv of time T−1, such as:

$$pv_T = \theta * v_T + (1-\theta) * pv_{T-1} \quad (1)$$

wherein θ is the coefficient for calculating the processed first velocity pv, and the processed first velocity pv can be initialized with 0. In this case, the acceleration of the processed first velocity pv is relatively stable, and the jerk of the processed first velocity pv is reduced. In another example, the processed first velocity pv may gradually accelerate until the processed first velocity pv reaches the current first velocity v. For example, the processed first velocity pv is incremented by a fixed amount per iteration or per unit of time until the processed first velocity pv reaches the current first velocity v: $pv_T=pv_{T-1}+\alpha_1$, wherein $\alpha_1$ is the increment velocity amount per iteration or per unit of time, and the processed first velocity pv can be initialized with 0. The processed first velocity pv can also be expressed in the integral form of time t, that is, $pv=pv_0+\int\alpha_1 dt$. Of course, $\alpha_1$ is negative when the first velocity v decreases. In this case, the acceleration $\alpha_1$ of the processed first velocity pv is kept constant, and thus the jerk of the processed first velocity pv is 0. In yet another example, the acceleration of the processed first velocity pv is not a constant, but a controlled function of time t, such as $$\alpha_t^v = f1(t),$$

wherein $$\alpha_t^v$$

is a variable acceleration of the processed first velocity pv; then the processed first velocity pv is calculated as $$pv = pv_0 + \int \alpha_t^v dt.$$

Specifically, a feed-forward control method could be adopted to calculate the desired acceleration of the processed first velocity pv based on a time-preview of the first velocity profile, wherein the acceleration of the processed first velocity pv is subject to a maximum acceleration value.

In one example, the processed second velocity pω has reduced amplitude compared to the second velocity ω. For example, the processed second velocity pω is the multiplication of the second velocity ω and a coefficient β, that is: pω=β*ω. In this case, the acceleration of the processed second velocity pω is relatively stable compared to that of the second velocity ω, and the jerk of the processed second velocity pω is reduced. In addition, the processed second velocity pω may be capped at a predefined maximum steering velocity to further ensure safety of the riding lawn mower 100 during turning. In another example, the processed second velocity pω may gradually accelerate until the processed second velocity pω reaches the current second velocity ω. For example, the processed second velocity pω is incremented by a fixed amount per iteration or per unit of time until the processed second velocity pω reaches the current second velocity ω: $p\omega_T = p\omega_{T-1} + \alpha_2$, wherein $\alpha_2$ is the increment amount per iteration or per unit of time, and the processed second velocity pω can be initialized with 0. The processed second velocity pω can also be expressed in the integral form of time t, that is, $p\omega_0 = p\omega_0 + \int \alpha_2 dt$. Of course, $\alpha_2$ is negative when the second velocity ω decreases. In this case, the acceleration $\alpha_2$ of the processed second velocity pω is kept constant, and thus the jerk of the processed second velocity pω is 0. In yet another example, the acceleration of the processed second velocity pω is not a constant, but a controlled function of time t, such as $$\alpha_t^\omega = f2(t),$$

wherein $$\alpha_t^\omega$$

is a variable acceleration of the processed second velocity pω; then the processed second velocity pω is calculated as $$p\omega = p\omega_0 + \int \alpha_t^\omega dt.$$

Specifically, a feed-forward control method could be adopted to calculate the desired acceleration of the processed second velocity pω based on a time-preview of the second velocity profile. Therefore, the acceleration of the first velocity v, i.e., the linear acceleration, is minimized or reduced; and the acceleration of the second velocity ω, i.e., the angular acceleration, is reduced independently. At the same time, since the first velocity v and the second velocity ω of the riding lawn mower 100, i.e., the linear velocity and the angular velocity of the riding lawn mower 100, are processed separately after decoupling, the processing of the (linear) acceleration response of the riding lawn mower 100 the processing of the steering response of the riding lawn mower 100 do not affect each other.

Figure 10:
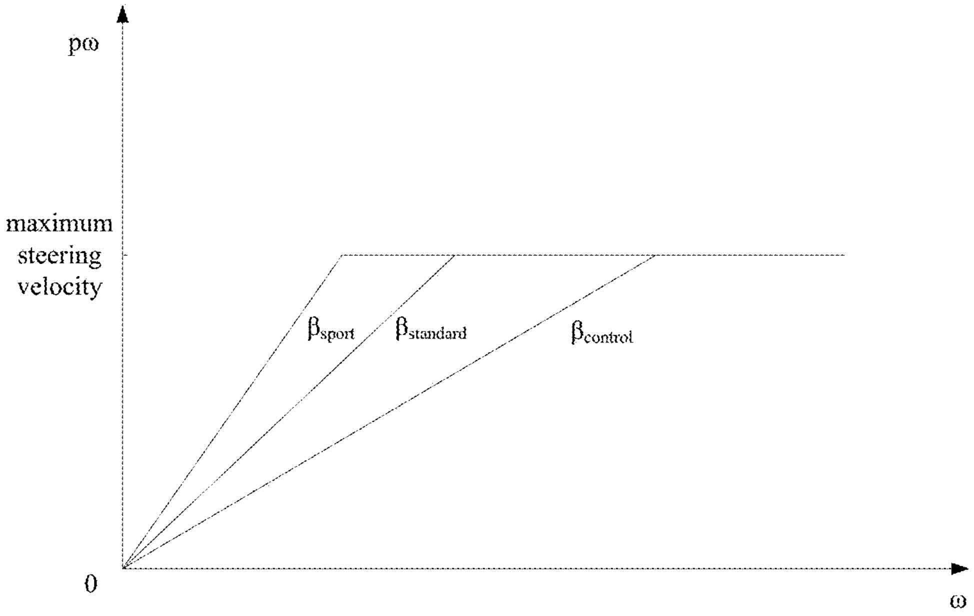
FIG. 10 is a schematic diagram of a target speed calculation unit of the left walking motor control module according to one example.

In one example, the riding lawn mower 100 provides the user with different driving modes. For example, the user may select the driving mode another operating member of the operating assembly, which is not limited herein. Different driving modes are configured with different responsiveness, giving the user a bunch of driving experiences to select from. For example, the riding lawn mower 100 has a standard mode, a control mode, and a sports mode. In order to achieve different control effects for these driving modes, the coefficients or functions for calculating at least one of the processed first velocity pv or the processed second velocity pc)) in different driving modes are configured to be different. For example, FIG. 10 shows the coefficient β in different driving modes and how 0 affects the processing of the second velocity. The sport mode is configured with the fastest acceleration among the three driving modes, thus the coefficient $\beta_{sport}$ for calculating the processed second velocity pc)) in the sports mode is the biggest. The standard mode is configured with a slower acceleration than that of the sport mode, thus the coefficient $\beta_{standard}$ for calculating the processed second velocity pc)) in the standard mode is less than that in the sport mode. The control mode is configured with the slowest acceleration among the three driving modes, thus the coefficient $\beta_{control}$ for calculating the processed second velocity pc)) in the control mode is the smallest. As shown in FIG. 10, the processed second velocity pc)) may be capped at the same predefined maximum steering velocity, that is, the maximum processed second velocity pc)) of the three driving modes are the same. Thereby, the sport mode gives a quicker response for a sporty drive, whereas the control mode gives a controlled drive with a slower response. In terms of the processing of the first velocity, in one example, the average acceleration during the control mode is 3.1 m/s', and it takes 1200 ms to reach the maximum walking speed from 0 speed; the average acceleration during the standard mode is 4.0 m/s', and it takes 900 ms to reach the maximum walking speed from 0 speed; the average acceleration during the sport mode is 4.4 m/s', and it takes 640 ms to reach the maximum walking speed from 0 speed.

S4: obtain a left target speed nl* for the left walking motor 123L from the first processed velocity pv and the second processed velocity pω.

As the linear velocity and the angular velocity, i.e., the first processed velocity pv and the second processed velocity pω, cannot be directly applied to drive the walking motor drive circuit 127, which includes the left walking motor drive circuit 127L and the right walking motor drive circuit 127R. In one example, the first processed velocity pv and the second processed velocity pω are used to compute a left target speed nl* and a right target speed nr*. The left target speed nl* is the target rotational speed of the left walking motor 123L, whereas the right target speed nr* is the target rotational speed of the right walking motor 123R. In a specific implementation, the right target speed nr* is computed as the sum of the first processed velocity pv and the second processed velocity pω divided by the distance 1 between the left second walking wheel and the right second walking wheel, that is, the right target speed nr*=pv+pω/l; whereas the left target speed nl* is computed as the subtraction of the first processed velocity pv and the second processed velocity pω divided by the distance l between the left second walking wheel and the right second walking wheel, that is, the left target speed nl*=pv−pω/l.

The above algorithm can be implemented identically in the left walking motor control module 124L and the right walking motor control module 124R. Thereby, the left walking motor control module 124L uses the left target speed nl* to control the left walking motor 123L, the right walking motor control module 124R uses the right target speed nr* to control the right walking motor 123R, simultaneously. In one example, the target rotational speed of the left walking motor 123L can be computed from the detected position signals from one of the left operation sensing module 132L or the right operation sensing module 132R. For example, the left walking motor control module 124L can also compute the target speed nl* of the left walking motor 123L from the detected position signals of the left operation sensing module 132L and the actual rotational speed nr of the right walking motor 123R. In one construction, a feed forward control may be adopted to predict the right reference speed $vr_{ref}$ from the actual rotational speed nr of the right walking motor 123R, so that the detected position signals of the right operation sensing module 132R is not required by the left walking motor control module 124L. Symmetrically, the right walking motor control module 124R can also compute the target speed nr* of the right walking motor 123R from the detected position signals of the right operation sensing module 132R and the actual rotational speed nl of the left walking motor 123L.

Having the target speed nl* of the left walking motor 123L, the left walking motor control module 124L further needs operational parameters of the left walking motor 123L itself in order to realize a closed-loop control of the left waking motor 123L. The left walking motor detection module 128L is coupled to the left walking motor 123L, and is configured to detect operational parameters of the left walking motor 123L, for example, such as, the rotor position, the actual rotational speed, and/or the phase currents of the left walking motor 123L. In one example, the left walking motor detection module 128L includes a speed detection sensor, which is arranged near or inside the left walking motor 123L to obtain the actual rotational speed of the left walking motor 123L; for example, a photoelectric sensor installed near the left walking motor 123L to obtain the actual rotational speed of the left walking motor 123L; for another example, a Hall sensor arranged near the rotor of the left walking motor 123L to obtain the rotor position and the actual rotational speed of the left walking motor 123L. In one example, if the left walking motor 123L is a brushless motor, the electrical signal output by the left walking motor 123L is a periodically changed back electromotive force, thus, by detecting one of the least of the current or voltage of the left walking motor 123L and spotting the zero-crossing point of the back electromotive force, the actual rotational speed of the left walking motor 123L can be obtained.

Figure 7:
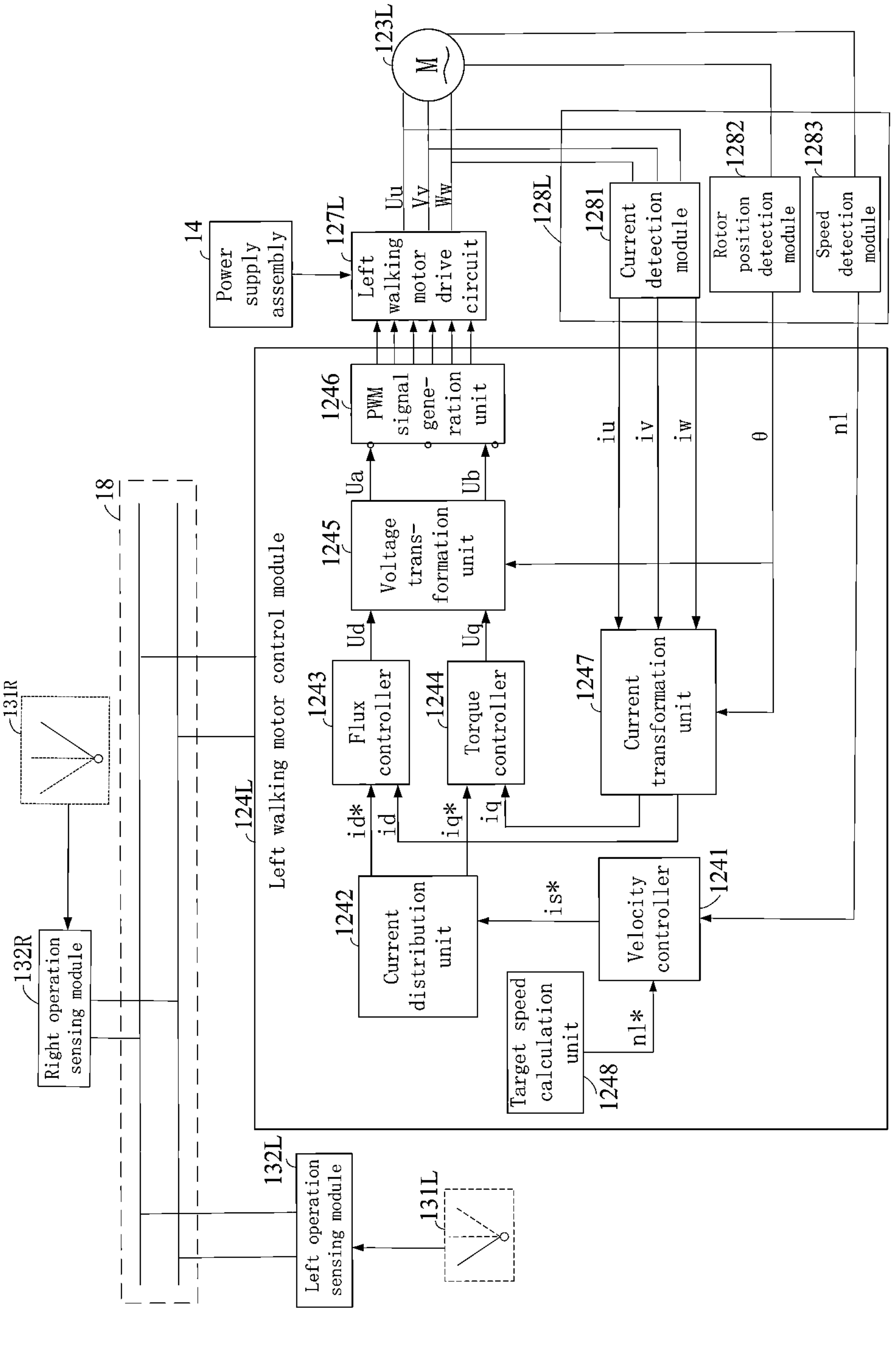
FIG. 7 is a schematic diagram of a left walking motor control module of the riding lawn mower according to an example.

More details of the control method adopted by the left walking motor control module 124L will be described with reference to FIG. 7. Specifically, the left walking motor control module 124L includes: a target speed calculation unit 1248, a velocity controller 1241, a current distribution unit 1242, a flux controller 1243, a torque controller 1244, a voltage transformation unit 1245, a current transformation unit 1247 and a PWM signal generation unit 1246. The left walking motor detection module 128L includes: a current detection module 1281, a rotor position detection module 1282, and a speed detection module 1283. These modules are introduced for the sake of clear description; in implementation, one operational parameter may be calculated from another, for example, the rotational speed of the motor can be deducted from information about the rotor position, therefore, these modules can be combined.

Figure 9:
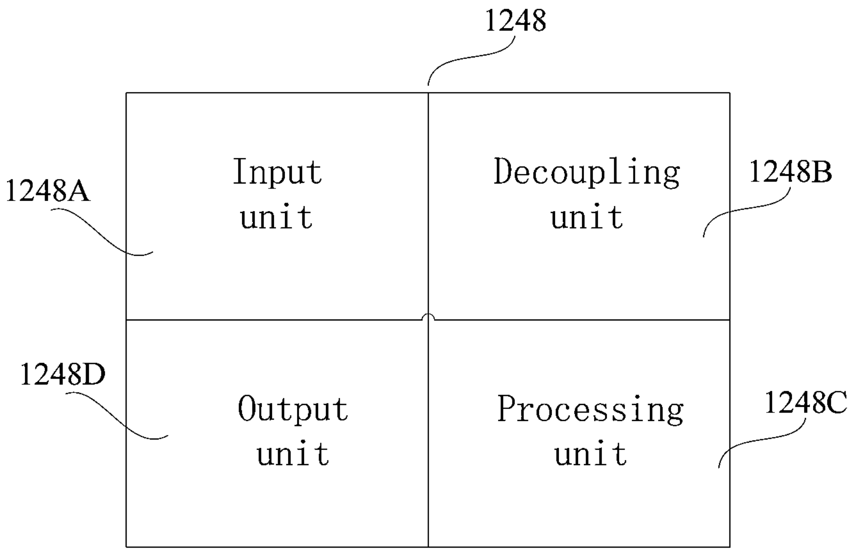
FIG. 9 is a chart diagram of a velocity coefficient applied in different driving modes according to one example.

In one example, the target speed calculation unit 1248 is configured to receive the detected position signals of the left operation sensing module 132L and the right operation sensing module 132R and outputs the target rotational speed nl* of the left walking motor 123L. The target speed calculation unit 1248 implements the steps of S1-S4 as described above. In one example, as shown in FIG. 9, the target speed calculation unit 1248 includes: an input unit 1248A configured to generate a left reference speed $vl_{ref}$ and a right reference speed $vr_{ref}$ from at least one of the left operational amount or the right operational amount; a decoupling unit 1248B configured to generate a first velocity v and a second velocity ω from the left reference speed $vl_{ref}$ and the right reference speed $vr_{ref}$; a processing unit 1248C configured to obtain a first processed velocity pv from the first velocity v and obtain a second processed velocity pω from the second velocity ω; and an output unit 1248D configured to generate a left target speed nl* for the left walking motor from the first processed velocity and the second processed velocity. The input unit 1248A, the decoupling unit 1248B, the processing unit 1248C and the output unit 1248D each functions as S1, S2, S3 and S4 described above.

The velocity controller 1241 is connected with the target speed calculation unit 1248 and the speed detection module 1283. The velocity controller 1241 obtains the target rotational speed nl* of the left walking motor 123L from the target speed calculation unit 1248 and the actual rotational speed nl of the left walking motor 123L detected by the speed detection module 1283. The velocity controller 1241 is configured to generate a target current is* of the left walking motor 123L according to the target rotational speed nl* and the actual rotational speed nl of the left walking motor 123L through comparison and adjustment. The resulted target current is* is configured to make the actual rotational speed nl of the left walking motor 123L approach the target rotational speed nl* of the left walking motor 123L.

In the related art, the velocity controller 1241 adopts a Proportional Integral (PI) controller. As the name suggests, the PI controller consists of a proportional term and an integral term. Increasing the proportional gain has the effect of proportionally increasing the control signal for the same level of error. The fact that the controller will "push" harder for a given level of error tends to cause the closed-loop system to react more quickly, but also to overshoot more. Another effect of increasing the proportional gain is that it tends to reduce, but not eliminate, the steady-state error. The addition of an integral term to the controller tends to further help reduce steady-state error. If there is a persistent, steady error, the integrator builds and builds, thereby increasing the control signal and driving the steady-state error down. A drawback of the integral term, however, is that it can make the system more sluggish (and oscillatory) since when the error signal changes sign, it may take a while for the integrator to "unwind". If the integral term is too large, it will cause overshoot, and if the integral term is too small, the response will be slow and insufficient.

Figure 11:
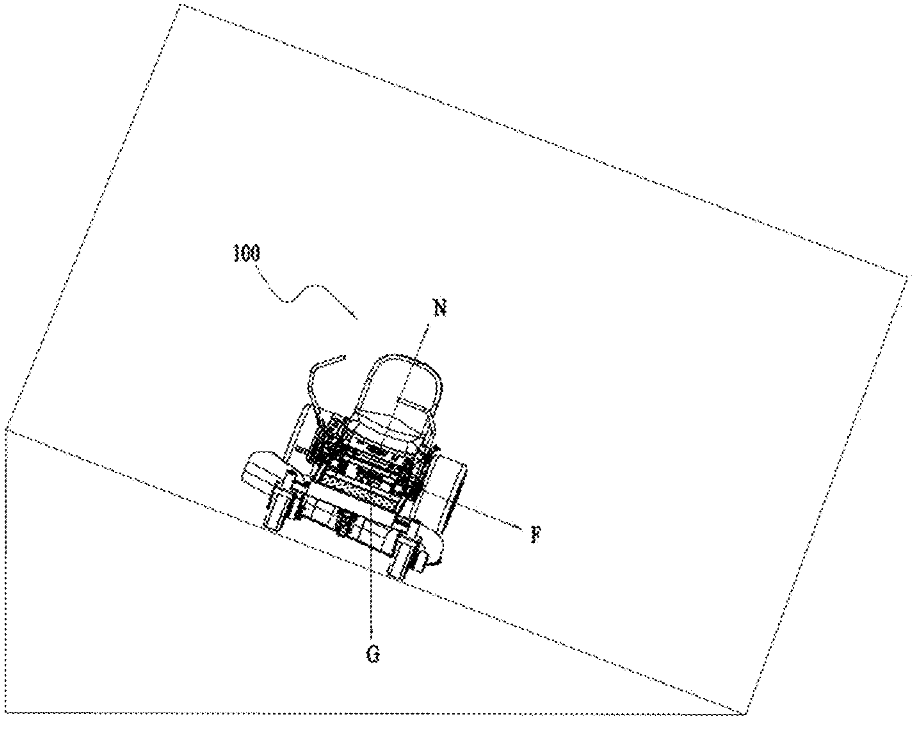
FIG. 11 is a force analysis diagram of the riding lawn mower on a sloping surface.

One proposed solution in this disclosure is to cancel the integral term and uses pure proportional gain to adjust the speed error of the left walking motor 123L, that is, the difference between the actual rotational speed nl of the left walking motor 123L and the target rotational speed nl* of the left walking motor 123L, which solves the problem of control lag caused by the integral term. However, pure proportional control will have a larger steady-state error, especially when the load of the left walking motor 123L is large. For example, as shown in FIG. 11, when the riding lawn mower 100 travels or works on a slope; especially when traversing a sloping surface horizontally, an inclined downward force is applied to the riding lawn mower 100 due to the gravity of the riding lawn mower 100, increasing the load of the riding lawn mower 100, causing the riding lawn mower 100 to have a inclined downward turning tendency. Further, the walking wheels are subject to forces of different magnitudes, for example, the wheels on the lower side of the slope are subject to a greater inclined downward force than the wheels on the higher side of the slope. Therefore, the second walking wheel 122 on the lower side of the slope has a larger load, so the steady-state error for controlling the second walking wheel 122 on the lower side of the slope becomes larger, as a result, the second walking wheel 122 on the lower side of the slope cannot provide enough torque to make the riding lawn mower 100 walk in a desired direction. Plus, as the first walking wheel 121 is configured to roll freely, the riding lawn mower 100 doesn't have much traction force in the front, so first walking wheel 121 of the riding lawn mower 100 also have a tendency slide down the slope. Therefore, the left walking control module 124L introduces a compensator for compensating the load on the left walking motor 123L.

Figure 12:
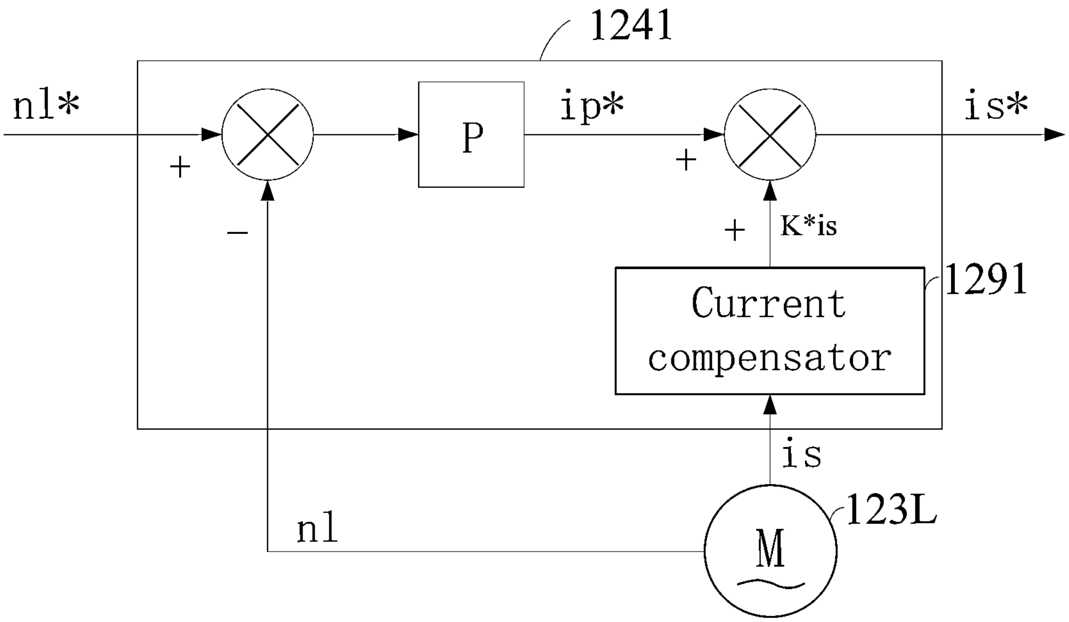
FIG. 12 is a schematic diagram of a velocity controller of the left walking motor control module according to one example.

In one example, referring to FIG. 12, the velocity controller 1241 further includes a current compensator 1291. The current compensator 1291 compensates for extra current caused by the load, for example, applied to the second walking wheel 122 on the lower side of the slope. As shown in FIG. 12, the current compensator 1291 obtains the actual current is of the left walking motor 123L. In one example, the current compensator 1291 is connected with the current detection module 1281. The current compensator 1291 generates a compensation amount based on the actual current is of the left walking motor 123L, for example, the compensation amount C is the actual current is of the left walking motor 123L multiplied by a compensation coefficient K, that is, the compensation amount C=K*is. Thus, the target current is* output by the velocity controller 1241 is a sum of the proportional gain ip* of the speed error of the left walking motor 123L and the compensation amount C.

In another example, the velocity controller 1241 further includes a disturbance observer 1292 to observe the load in real time and add feed-forward compensation, which eliminates the influence of the load. In one example, the disturbance observer 1292 is an extended state observer (ESO) which takes the detected actual speed of the left walking motor 123L and the control amount of the velocity controller 1241, estimates the total disturbance and tracks the underlying noise-free trend in real time. Thereby, external disturbances and unknown internal dynamics are accommodated in such a way that control can be exerted in the absence of a detailed mathematical model. Dynamic processes such as the air resistance, and the gravitational force, the friction force and so on are treated as a single total disturbance. The total disturbance is then treated as an additional state of the riding lawn mower 100 that is computed in real-time by the ESO to be corrected for in the feedback process. By cancelling the total disturbance, the plant, i.e., the left walking motor 123L, is reduced to its simplest form and as such is easily controllable via the proportional term. This method has the advantages of no control overshoot and fast load compensation.

Figure 13:
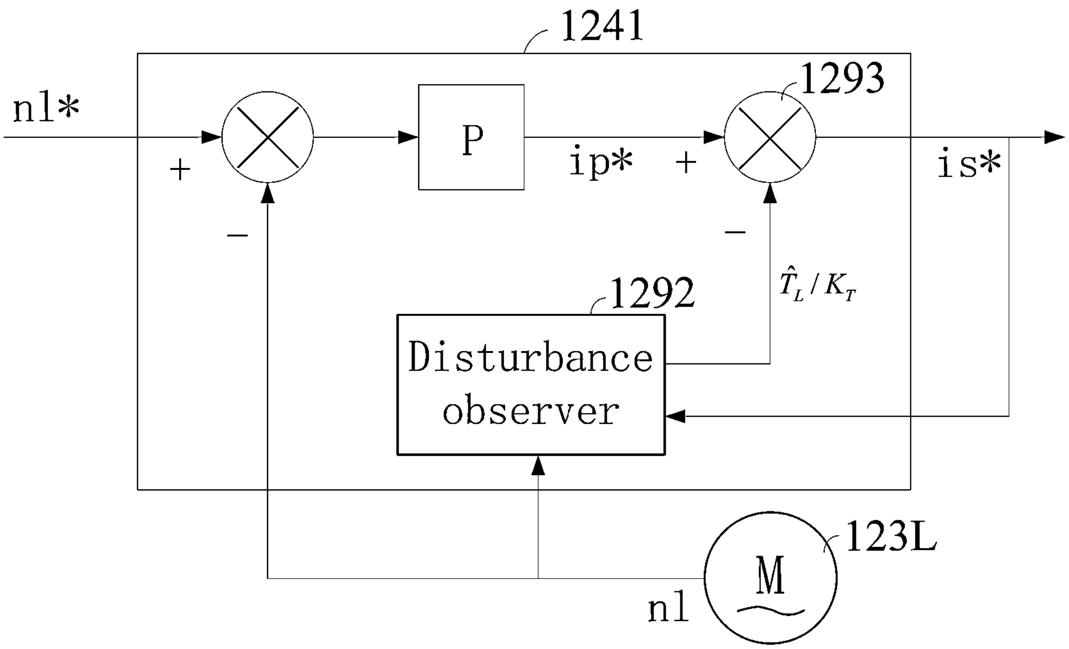
FIG. 13 is a schematic diagram of a velocity controller of the left walking motor control module according to another example.

Specifically, referring to FIG. 13, the disturbance observer 1292 obtains the actual rotational speed nl of the left walking motor 123L, for example, through the speed detection module 1283, as well as the target current is* output by the velocity controller 1241. The disturbance observer 1292 estimates the total disturbance according to the actual rotational speed nl and the target current is*. In this example, the total disturbance in represented by a load torque $\hat{T}_L$ of the left walking motor 123L. The disturbance observer 1292 may make use of mathematical models such as a cascading mathematical model or a convergence mathematical model to estimate the load torque $\hat{T}_L$ of the left walking motor 123L. As a simplified explanation, the total torque T of the left walking motor 123L is the electromagnetic torque Te deducted by the load torque $\hat{T}_L$, wherein the electromagnetic torque Te can also be expressed as the product of the target current is* and the torque constant $K_T$ of the left walking motor 123L. The torque constant $K_T$ is a known constant specific to motor's design, including its magnetic strength, number of wire turns, and armature length. The torque T of the left walking motor 123L also equals the product of the moment of inertia J of the left walking motor 123L, which is also a constant value, and the time derivative of the actual rotational speed nl of the left walking motor 123L. After the disturbance observer 1292 estimates the load torque $\hat{T}_L$, a correction amount of $\hat{T}_L/K_T$ is applied to the proportional gain ip* of the speed error of the left walking motor 123L in a feedback compensator 1293.

The current distribution unit 1242 is connected to the velocity controller 1241, and is configured to distribute a target direct axis current id* and a target quadrature axis current iq* based on the target current is*. The target quadrature axis current iq* and the target direct axis current id* can be obtained by calculation, or can be set directly, for example, id* may be set to 0. The target direct axis current id* and the target quadrature axis current iq* distributed by the current distribution unit 1242 according to the target current is* can cause the rotor of the left walking motor 123L to generate different electromagnetic torque Te, so that the left walking motor 123L can reach the target rotational speed nl* through a desired acceleration.

The current transformation unit 1247 obtains the three-phase currents iu, iv, and iw through the current detection module 1281 and performs current transformation to convert the three-phase currents iu, iv, and iw into two-phase currents, which are the actual direct axis current id and the actual quadrature axis current iq, respectively. Optionally, the current transformation unit 1247 includes Park transformation and Clark transformation.

The flux controller 1243 is connected with the current distribution unit 1242 and current transformation unit 1247. The flux controller 1243 obtains the target direct axis current id* from the current distribution unit 1242 and the actual direct axis current id from the current transformation unit 1247. The flux controller 1243 is configured to generate a first voltage adjustment amount Ud according to the target direct axis current id* and the actual direct axis current id through comparison and adjustment. The resulted first voltage adjustment amount Ud is configured to make the actual direct axis current id approach the target direct axis current id* as soon as possible. The flux controller 1243 may include a PI controller, and the flux controller 1243 includes comparing the target direct axis current id* and the actual direct axis current id, and performing a PI adjustment according to the comparison result to generate the first voltage adjustment amount Ud.

The torque controller 1244 is also connected with the current distribution unit 1242 and current transformation unit 1247. The torque controller 1244 obtains the target quadrature axis current iq* from the current distribution unit 1242 and the actual quadrature axis current iq from the current transformation unit 1247, and generates a second voltage adjustment amount Uq. The second voltage adjustment amount Uq is configured to make the actual quadrature axis current iq approach the target quadrature axis current iq* as soon as possible.

In the related art, the torque controller 1244 adopts a Proportional Integral (PI) controller. The problem with using a PI controller in the torque controller 1244 is the same as using a PI controller in the velocity controller 1241, which will not be repeated herein. Similarly, in one example, the torque controller 1244 includes a disturbance observer 1294 to observe the load in real time and add feed-forward compensation, which eliminates the influence of the load. In one example, the disturbance observer 1294 is an extended state observer (ESO) which takes the detected actual current of the left walking motor 123L and the control amount of the torque controller 1244, estimates the total disturbance and tracks the underlying noise-free trend in real time.

Figure 14:
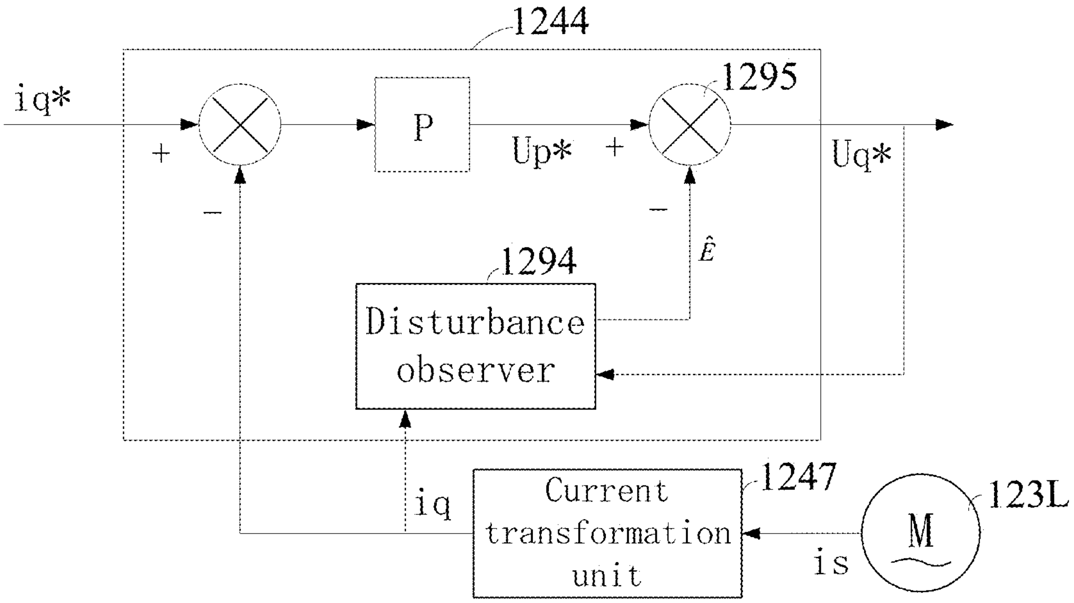
FIG. 14 is a schematic diagram of a flux controller of the left walking motor control module according to one example.

Specifically, referring to FIG. 14, the disturbance observer 1294 obtains the actual quadrature axis current iq of the left walking motor 123L, for example, through the current transformation module 1247, as well as the second voltage adjustment amount Uq output by the torque controller 1244. The disturbance observer 1294 estimates the total disturbance according to the actual quadrature axis current iq and the second voltage adjustment amount Uq. In this example, the total disturbance in represented by a load voltage E of the left walking motor 123L. The disturbance observer 1294 may make use of mathematical models such as a cascading mathematical model or a convergence mathematical model to estimate the load voltage E of the left walking motor 123L. After the disturbance observer 1294 estimates the load voltage E, it is applied to the proportional gain Up* of the quadrature axis current error of the left walking motor 123L, that is, the difference of the target quadrature axis current iq* and the actual quadrature axis current iq of the left walking motor 123L in a feedback compensator 1295. To be cost efficient, the left walking motor control module 124L is configured to introduce a disturbance observer and a feedback compensator in either the velocity controller 1241 or the flux controller 1243.

The voltage transformation unit 1245 obtains the first voltage adjustment amount Ud and the second voltage adjustment amount Uq from the flux controller 1243 and the torque controller 1244 respectively, as well as the position of the rotor of the left walking motor 123L from the rotor position detection module 1282, and converts the first voltage adjustment amount Ud and the second voltage adjustment amount Uq into intermediate voltage adjustment amounts Ua and Ub related to the three-phase voltage Uu, Uv, Uw applied to the left walking motor 123L, and output them to the PWM signal generation unit 1246. Optionally, the voltage transformation unit 1245 includes inverse Park transformation.

The PWM signal generation unit 1246 generates PWM signals for controlling the switching elements of the left walking motor drive circuit 127L according to the intermediate voltage adjustment amounts Ua and Ub, so that the power supply assembly 14 can output three-phase voltages Uu, Uv, Uw to be applied to the windings of the walking motor 123. In one example, the PWM signal generation unit 1246 adopts the SVPWM technique. In one example, Uu, Uv, Uw are three-phase symmetrical sine wave voltages or saddle wave voltages, and the three-phase voltages Uu, Uv, Uw form a 120° phase difference with each other.

The left walking motor drive circuit 127L is connected to the left walking motor control module 124L and the left walking motor 123L, and configured to control the operation of the left walking motor 123L according to the signal output by the left walking motor control module 124L. Optionally, the left walking motor 123L may be connected to the left second walking wheel 122L through a deceleration device. The output speed of the left walking motor 123L is decelerated by the deceleration device 41L and then output to the left second walking wheel 122L to drive the left second walking wheel 122L to rotate. The torque of the left walking motor 123L is transmitted to the left second walking wheel 122L through the deceleration device to drive the left second walking wheel 122L. In other examples, the left walking motor 123L directly drive the left second walking wheel 122L.

Figure 15:
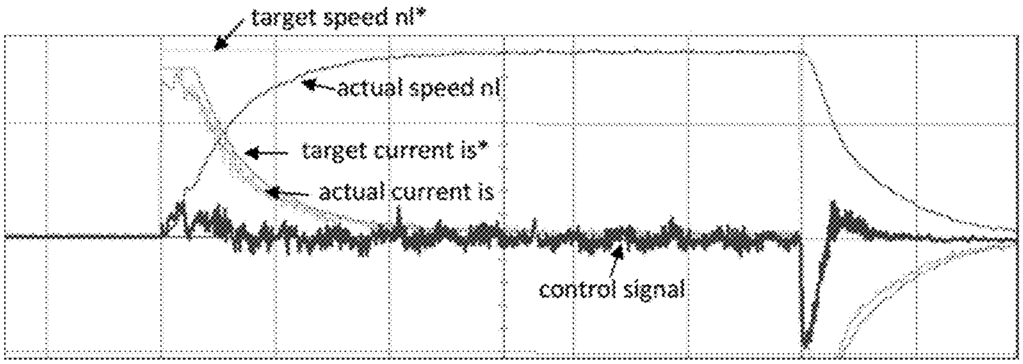
FIG. 15 is a chart showing the rotational speed and the current of the left walking motor according to one example.

With the control method described in this disclosure, one the one hand, referring to FIG. 15, the left walking motor control module 124L responds quickly to make the actual rotational speed nl of the left walking motor 123L approach the target rotational speed nl* of the left walking motor 123L with no overshoot, even if the riding lawn mower 100 is affected by other disturbance factors, for example, such as, traversing a sloped surface and subject to extra load. During such process, the actual current is of the left walking motor 123L approximates the target current is* of the left walking motor 123L. On the other hand, as the left walking motor control module 124L generates the target rotational speed nl* of the left walking motor 123L based on the detected position signals of the left operating member 131L and the right operating member 131R, or based on the detected position signal of the left operating member 131L and the actual rotational speed nr of the right walking motor 123R, the generated target rotational speed nl* of the left walking motor 123L accommodates for the needs of stable acceleration and flexible steering at the same time, thereby providing the user a comfortable and responsive driving experience. In addition, the generated target rotational speed nl* of the left walking motor 123L also enables a variety of driving mode configurations, thus the user can choose different driving modes for different driving experiences.

The right walking control system is similar or identical to the left walking control system, except that the right walking control module 124R calculates the right target speed nr* and controls the right walking motor 123R, and therefore will not be repeated herein. In one example, the riding lawn mower 100 has a central walking motor control module 124C instead of the left walking motor control module 124L and the right walking motor control module 124R, and the central walking motor control module 124C controls both the left walking motor 123L and the right walking motor 123R with the same control method, which will not be repeated herein.

Aspects of this disclosure are also applicable to riding machines of other types, as long as the riding machine can output power in other forms besides walking power in order to realize other functions besides walking. The above described examples, of course, are not to be construed as limiting the breadth of the present invention. Modifications, and other alternative constructions, will be apparent which are within the spirit and scope of the invention as defined in the appended claims.

What is claimed is:

1. A riding lawn mower, comprising:

a seat for a user to sit thereon;

a chassis configured to support the seat;

a driving assembly comprising at least one first wheel, a left second wheel, a right second wheel, a left motor for driving the left second wheel, and a right motor for driving the right second wheel;

a left operating member and a right operating member, the left operating member operable by the user to generate a left operational amount and the right operating member operable by the user to generate a right operational amount; and a motor control module configured to receive at least one of the left operational amount or the right operational amount and control at least one of the left motor or the right motor;

wherein the motor control module comprises a target speed calculation unit and the target speed calculation unit comprises:

an input unit configured to generate a left reference speed and a right reference speed from at least one of the left operational amount or the right operational amount;

a decoupling unit configured to generate a first velocity and a second velocity from the left reference speed and the right reference speed;

a processing unit configured to independently obtain a first processed velocity from the first velocity and obtain a second processed velocity from the second velocity; and an output unit configured to generate a left target speed for the left motor or a right target speed for the right motor from the first processed velocity and the second processed velocity.

2. The riding lawn mower of claim 1, wherein the first velocity is a linear velocity and the second velocity is an angular velocity.

3. The riding lawn mower of claim 1, further comprising a left motor control module configured to control the left motor and a right motor control module configured to control the left motor.

4. The riding lawn mower of claim 3, wherein the left motor control module calculates the left target speed for the left motor and the right motor control module calculates the right target speed for the right left motor.

5. The riding lawn mower of claim 4, wherein the left motor control module receives both the left operational amount and the right operational amount, the left reference speed is a mapped value of the left operational amount, and the right reference speed is a mapped value of the right operational amount.

6. The riding lawn mower of claim 4, wherein the left motor control module receives the left operational amount and an actual rotational speed of the right motor.

7. The riding lawn mower of claim 1, wherein the decoupling unit calculates the first velocity as an average value of the left reference speed and the right reference speed and calculates the second velocity as a difference between the left reference speed and the right reference speed divided by a distance between the left second wheel and the right second wheel.

8. The riding lawn mower of claim 1, wherein the processing unit makes the processed first velocity subject to a maximum acceleration value.

9. The riding lawn mower of claim 1, wherein the riding lawn mode has a plurality of different driving modes.

10. The riding lawn mower of claim 9, wherein the processing unit is configured with different coefficients or functions for calculating the processed first velocity from the first velocity or calculating the processed second velocity from the second velocity across different the plurality of driving modes.

11. A riding lawn mower, comprising:

a seat for a user to sit thereon;

a chassis configured to support the seat;

a driving assembly comprising a wheel and a motor for driving the wheel;

an operating member operable by the user to generate an operational amount; and a motor control module configured to receive the operational amount and control the motor;

wherein the motor control module comprises:

a target speed calculation unit configured to generate a target speed of the motor based on the operational amount, a velocity controller configured to generate a target current of the motor based on the target speed and a detected actual speed of the motor;

a flux controller and a torque controller configured to generate a first voltage adjustment amount and a second voltage adjustment amount according to the target current and a detected actual current of the motor; and a compensator for compensating load on the motor.

12. The riding lawn mower of claim 11, wherein the velocity controller comprises a proportional term of the difference of the target speed and the detected actual speed of the motor.

13. The riding lawn mower of claim 12, wherein the velocity controller comprises a current compensator that generates a compensation amount based on the detected actual current of the motor.

14. The riding lawn mower of claim 12, wherein the velocity controller comprises a disturbance observer and a feedback compensator.

15. The riding lawn mower of claim 14, wherein the disturbance observer derives a compensation amount based on the detected actual speed of the motor and the target current output by the velocity controller.

16. The riding lawn mower of claim 11, wherein the torque controller comprises a proportional term of the difference of a quadrature axis portion of the target current and a quadrature axis portion of the detected actual current of the motor.

17. The riding lawn mower of claim 16, wherein the torque controller comprises a disturbance observer and a feedback compensator.

18. The riding lawn mower of claim 17, wherein the disturbance observer derives a compensation amount based on the quadrature axis portion of the detected actual current of the motor and the second voltage adjustment amount output by the torque controller.

19. The riding lawn mower of claim 11, wherein the operating member comprises a left operating member and a right operating member, the left operating member is operable by the user to generate a left operational amount, and the right operating member is operable by the user to generate a right operational amount.

20. The riding lawn mower of claim 19, wherein the target speed calculation unit is configured to generate the target speed of the motor through generating a linear velocity and an angular velocity from the left operational amount and the right operational amount.

* * * * *